United States Patent [19]
Takahashi et al.

[11] Patent Number: 5,138,769
[45] Date of Patent: Aug. 18, 1992

[54] SCROLL SAW

[75] Inventors: Shoji Takahashi; Kouichi Miyamoto, both of Tokyo, Japan

[73] Assignee: Ryobi Ltd., Hiroshima, Japan

[21] Appl. No.: 724,038

[22] Filed: Jul. 1, 1991

Related U.S. Application Data

[63] Continuation-in-part of Ser. No. 557,838, Jul. 26, 1990, Pat. No. 5,035,059.

[30] Foreign Application Priority Data

Aug. 4, 1989 [JP] Japan ................................. 1-203614

[51] Int. Cl.⁵ .................... B23D 49/04; B23D 49/10; B23D 55/00
[52] U.S. Cl. ........................................ 30/392; 30/393; 83/783
[58] Field of Search ................ 30/392, 393, 272.1, 30/273; 83/781, 783, 785, 698

[56] References Cited

U.S. PATENT DOCUMENTS

| | | | |
|---|---|---|---|
| 1,839,647 | 1/1932 | Combs | 83/781 |
| 3,895,438 | 7/1975 | Burkepile et al. | 30/392 |
| 4,503,742 | 3/1985 | Sutton | 83/783 |
| 4,838,138 | 6/1989 | Rice | 83/783 |
| 4,949,616 | 8/1990 | Chang | 83/783 |
| 4,953,431 | 9/1990 | Chen | 30/393 |
| 5,018,420 | 5/1991 | Plomb | 83/783 |

Primary Examiner—Douglas D. Watts
Assistant Examiner—Paul M. Heyrana, Sr.
Attorney, Agent, or Firm—Sughrue, Mion, Zinn, Macpeak & Seas

[57] ABSTRACT

A scroll saw having a blade includes a body, a piston connected to the blade as to be moved upwardly and downwardly, and a motor for driving the piston upwardly and downwardly. A hung member is removably secured to the sawing blade. A pulled-down member is removably secured to the other end of the blade. A hanger is engaged with the hung member, and an arm secured to the body is configured so as not to interfere with the workpiece. A pulling-down member is engaged with the pulled-down member, and a suspension unit including a spring is attached to the arm and adapted to tension the blade by the elastic restoring force of the spring as the piston moves. The scroll saw machine is appropriately used as a fixed-installation type or a hand-held type saw.

39 Claims, 7 Drawing Sheets

SCROLL SAW

This is a continuation-in-part of application Ser. No. 07/557,838, filed Jul. 26, 1990, U.S. Pat. No. 5,035,059.

BACKGROUND OF THE INVENTION

The present invention relates to a scroll saw machine having a sawing blade which is moved upwardly and downwardly by a motor to cut a workpiece along a desired curve. In addition, the present invention relates to a scroll saw machine whose sawing blade is tightly set in a vertical position through a table and moved up and down by a motor as a workpiece on the table is moved to be cut along a desired curve by the blade. The invention more particularly relates to a scroll saw machine lo whose sawing blade always can be set at an appropriate tension depending on the strength of the blade and/or can be easily attached so as to orient the width of the blade either forwardly or sidewardly.

Since the compressive strength of the sawing blade of a scroll saw is very low, a first end of the blade is coupled to the lower end of a piston, which is moved upwardly and downwardly by a motor. The blade is supported at a second end thereof by a U-shaped arm, provided so as not to interfere with a workpiece, and the blade is pulled downwardly at the second end. Thus, the blade is reciprocated by upward and downward movement of the piston while always keeping the blade taut.

Conventional scroll saws have been provided previously which are of the heavy, fixed-installation type, as disclosed in Japanese Patent Examined Publications Nos. 3158/77 and 20720/78. A workpiece is cut along a desired curve by the conventional scroll saw, while the workpiece, positioned on a table, is turned relative to a sawing blade.

In a hand-held scroll saw, no table is provided, and a workpiece is not turned relative to a sawing blade. Instead, the workpiece is fixed in position. Hence, the hand-held scroll saw requires not only a U-shaped arm thereof to be compact, but also a blade support device for reciprocating the blade while keeping the blade taut. In the hand-held scroll saw, the construction of the blade support device is paramount over making the U-shaped arm compact.

Thus, the blade support device of the hand-held scroll saw typically cannot be constituted similarly to the scroll saws of the heavy, fixed-installation type, or manufactured by making the blade support device compact by using components equivalent to the scroll saws of the heavy, fixed-installation type. Additionally, since the range of the workpiece cut off by the hand-held scroll saw would be made narrow if the U-shaped arm thereof is made compact, the range must be prevented from being made narrow by making the U-shaped arm large and cumbersome. Thus, in conventional hand-held saws, a compact hand-held scroll saw with a suitable range cannot be achieved. This presents a problem.

Further, in a conventional scroll saw machine of the fixed-installation type, a sawing blade is coupled at the lower end thereof to a piston, which is moved upwardly and downwardly by a motor, and the blade is always pulled upwardly at the upper end thereof as the blade is moved upwardly and downwardly. The conventional scroll saw machine of the fixed-installation type comprises a body including a table which is the upper part of the body, which bears a workpiece thereon and which has a slit through which the sawing blade extends, a piston which is provided under the slit and to which the blade is secured at the upper end thereof, and a piston drive means having a motor in an appropriate position to drive the piston; an arm secured lo at the lower portion thereof to the body and extending so that the arm rises from a prescribed point behind the table and the front end of the upper portion of the arm is located at a prescribed point over the piston; and a suspension unit which is attached to the arm at the front end of the upper portion thereof and to which the blade, which is coupled at the lower end thereof to the upper end of the piston, is secured at the upper end of the blade, as disclosed in Japanese Patent Examined Publications Nos. 3158/77, 20720/78 and 49361/82.

The suspension unit for supporting the sawing blade at the upper end thereof and for tightening the blade in the vertical movement of the piston is not capable of adjusting the blade tension. Thus, there are problems that if a buckling load acts on a sawing blade having a very low buckling strength because of the resistance of the workpiece to the blade in the upward movement of the piston, the blade is likely to break and the cutting precision of the workpiece by the blade is low.

Other problems include that the suspension unit has a complicated structure and projects substantially over the front end of the upper portion of the arm, resulting in the height of the machine being large. Since the sawing blade cannot be attached so as to orient the width thereof sidewardly (although it can be attached so as to orient the width thereof forwardly), there is yet another problem that the maximum length of the workpiece able to cut is not larger than the distance between the blade and the arm.

SUMMARY OF THE INVENTION

The present invention was designed to solve the above-mentioned problems of the conventional saw machines.

It is an object of the present invention to provide a scroll saw machine having a simple construction and high cutting performance, in Which a sawing blade is moved upwardly and downwardly by a motor to cut a workpiece along a desired curve and in which the blade is kept taut continuously to prevent the blade from buckling, and thereby breaking.

It is another object of the present invention to provide a scroll saw machine in which the width direction (i.e., orientation) of the sawing blade can be changed easily from a forward direction to a sideward direction to cut a workpiece along a slender, sideward contour.

It is yet another object of the present invention to provide a hand-held scroll saw having a sawing blade which is easily replaceable.

Accordingly, it is a primary object of the present invention to provide a scroll saw machine in which even if a buckling load acts on a sawing blade because of the of a workpiece to the blade in the upward movement of a piston, the blade is not likely to break and the precise cutting of the workpiece by the blade is maintained.

The inventive saw machine comprises a body including a table which is the upper part of the body, which bears the workpiece on the table and which has a slit through which the sawing blade extends, a piston provided under the slit and which is moved upwardly and downwardly and to which the blade is secured at the upper end of the piston, and a piston drive means having a motor in an appropriate position to drive the piston; a hung member removably secured to the blade at the upper end thereof; a pulled-down member removably secured to the blade at the lower end thereof; an arm secured at the lower portion thereof to the body and extending so that the arm rises from a prescribed point behind the table, and the front end of the upper horizontal portion of the arm is located at a prescribed point over the piston; a hanger with which the hung member is engaged so that the hung member is borne on the hanger; a pulling-down member which is secured to the piston at the upper end thereof and with which the pulled-down member is engaged so that the pulling-down member is borne on the pulled-down member; and a suspension unit which is secured at the butt thereof to the upper horizontal portion of the arm, overhangs the piston at the tip of the unit and elastically urges the hanger at the tip of the unit so as to pull the hanger upwardly by the elastic restoring force of the unit along with the upward movement of the piston.

The machine is characterized by the suspension unit which includes a spring for supporting and lifting the hanger to keep the sawing blade taut; and a spring force adjuster for adjusting the force of the spring.

To attach the sawing blade, the hanger is lowered against the urging force of the spring, the hung member secured to the blade at the upper end thereof is engaged with the hanger, and the pulled-down member secured to the blade at the lower end thereof is engaged with the pulling-down member coupled to the piston. Thereafter, the spring is caused to normally urge the hanger again, and the spring force adjuster is manipulated to set the sawing blade at an optimal tension depending on the o strength of the blade. Then, the workpiece is moved in a desired direction on the table as the piston is moved upwardly and downwardly by the motor, so that the workpiece is cut to a desired form as the blade is pulled downwardly by the moved-down piston. In the upward movement of the piston, the spring and the spring force adjuster cooperate together to keep the sawing blade at an optimal tension as the blade is moved upwardly. Hence, even if the buckling load acts to the sawing blade because of the resistance of the workpiece to the blade in the upward movement of the piston, the blade is not likely to break and a highly precise cutting of the workpiece by the blade is achieved.

It is another primary object of the present invention to provide a scroll saw machine in which a sawing blade can be easily and quickly attached so that the width thereof is oriented either forwardly or sidewardly and the blade is pivotally supported at both the ends thereof.

In another embodiment, the inventive machine comprises a body including a table which is the upper part of the body, bears a workpiece on the table and has a slit through which the sawing blade extends, a piston which is provided under the slit and is moved upwardly and downwardly and to which the blade is secured at the upper end of the piston, and a piston drive means having a motor in an appropriate position to drive the piston; a hung member removably secured to the blade at-the upper end thereof; a pulled-down member removably secured to the blade at the lower end thereof; an arm secured at the lower portion thereof to the body and extending so that the arm rises from a prescribed point behind the table and the front end of the upper horizontal portion of the arm is located at a prescribed point over the piston; a hanger with which the hung member is engaged so that the hung member is borne on the hanger; a pulling-down member which is secured to the piston at the upper end thereof and with which the pulled-down member is engaged so that the pulling-down member is borne on the pulled-down member; and a suspension unit which is secured at the butt thereof to the upper horizontal portion of the arm, overhangs the piston at the tip of the unit and elastically urges the hanger at the tip of the unit so as to pull the hanger upwardly by the elastic restoring force of the suspension unit along with the upward movement of the piston.

The machine is charaterized by the hanger and the pulling-down member having engagement portions having cruciformly-disposed recesses in which the hung member and the pulled-down member can be stably supported on the engagement portions to extend in either of two mutually perpendicular directions. The workpiece is moved in a desired direction on the table as the piston is moved upwardly and downwardly by the piston, so that the workpiece is cut to a desired form by the sawing blade as the blade is pulled downwardly by the moved-down piston.

In the upward movement of the piston, the sawing blade is kept taut by the urging force of the suspension unit as the blade is moved upwardly. If the direction of the width of the sawing blade is to be changed from forward to sideward, the suspension unit is first put out of urging action so that the height of the hanger is reduced by a prescribed length. As a result, the pulled-down member is disengaged from the engagement surface of the pulling-down member. Then, the sawing blade is grasped and turned so that the direction of the blade width is changed from forward to sideward. Thereafter, the suspension unit is put back into urging action so that the hung member is lifted with the hanger, and the pulled-down member is engaged with the engagement surface of the pulling-down member, thus completing the changing of the width direction of the blade. Since the hanger and the pulling-down member have the engagement portions having the cruciformly-disposed recesses in which the hung member and the pulled-down member can be stably supported on the engagement portions to extend in either of two mutually perpendicular directions, the sawing blade can be easily and quickly attached to orient the width thereof either forwardly or sidewardly and pivotally support the blade at both ends thereof.

It is yet another primary object of the present invention to provide a hand-held scroll saw comprising: a body including a handle provided at the upper portion of the body so as to be grasped by an operator's hand to hold the saw, a base plate provided at the lower portion of the body so as to be slidable on the workpiece, a piston provided over the front portion of o the foot plate to be moved upwardly and downwardly, and a motor provided between the handle and the foot plate to move the piston upwardly and downwardly; a hung member removably secured to the blade at the upper end thereof; a hanger secured to the piston at the lower end thereof and engaged with the hung member; a U-shaped arm having an upper portion secured to the body and a lower portion which is located near the lower end of the blade, so that the U-shaped arm does not interfere with the workpiece; a pulled-down member removably secured to the blade at the lower end thereof; a pulling-down member engaged with the pulled-down member; and a spring attached to the U- shaped arm to lower the pulled-down member by the elastic restoring force of the spring.

When the workpiece is to be cut along a desired contour by the hand-held scroll saw, the handle is grasped by an operator's hand to hold the saw body, and the front portion of the foot plate is positioned on the edge of the workpiece, which has been clamped horizontally. The motor is driven to reciprocate the piston, and then the saw body is slowly moved along a desired contour to cut the workpiece by the cutting force of the blade. The cutting of the workpiece is performed when the blade is pulled upwardly by the ascent of the piston to which the blade is secured.

When the piston is upwardly and downwardly moved, the blade is pulled downwardly by the downward urging force of the spring on the pulling-down member to which a lower portion of the blade is secured. Thus, the blade is upwardly and downwardly moved while always keeping the blade taut. As a result, the workpiece is cut precisely and the blade is prevented from buckling and thereby breaking.

BRIEF DESCRIPTION OF THE DRAWINGS

The above and other objects, features, and advantages of the invention will become more apparent from the following detailed description when read in conjunction with the accompanying drawings in which.

DETAILED DESCRIPTION OF THE PREFERRED EMBODIMENT

Embodiments of the present invention are described in detail hereinafter with reference to the drawings attached hereto.

Figure 1:
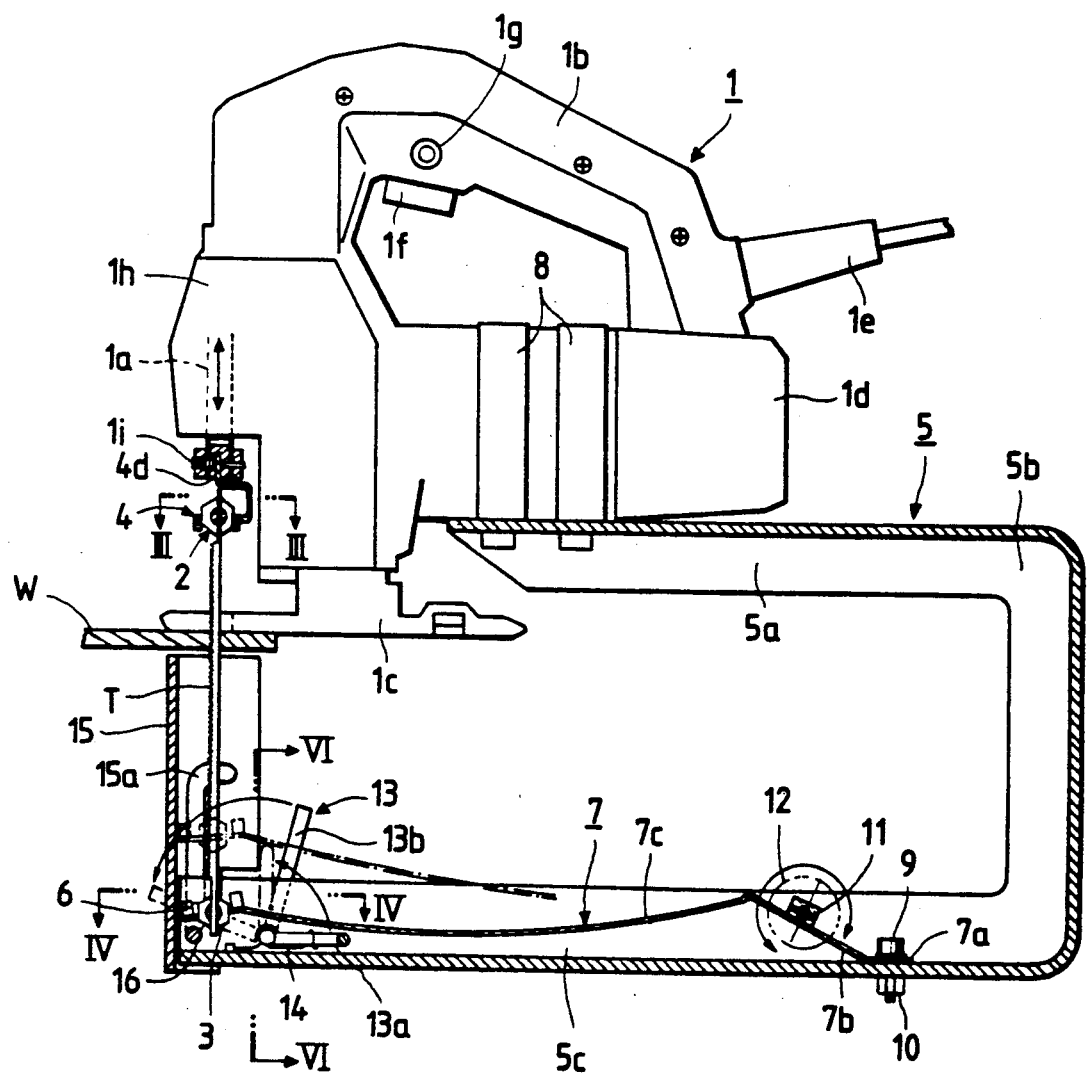
FIG. 1 is a partially longitudinal sectional side view of a scroll saw machine according to the first embodiment of the present invention.
Figure 2:
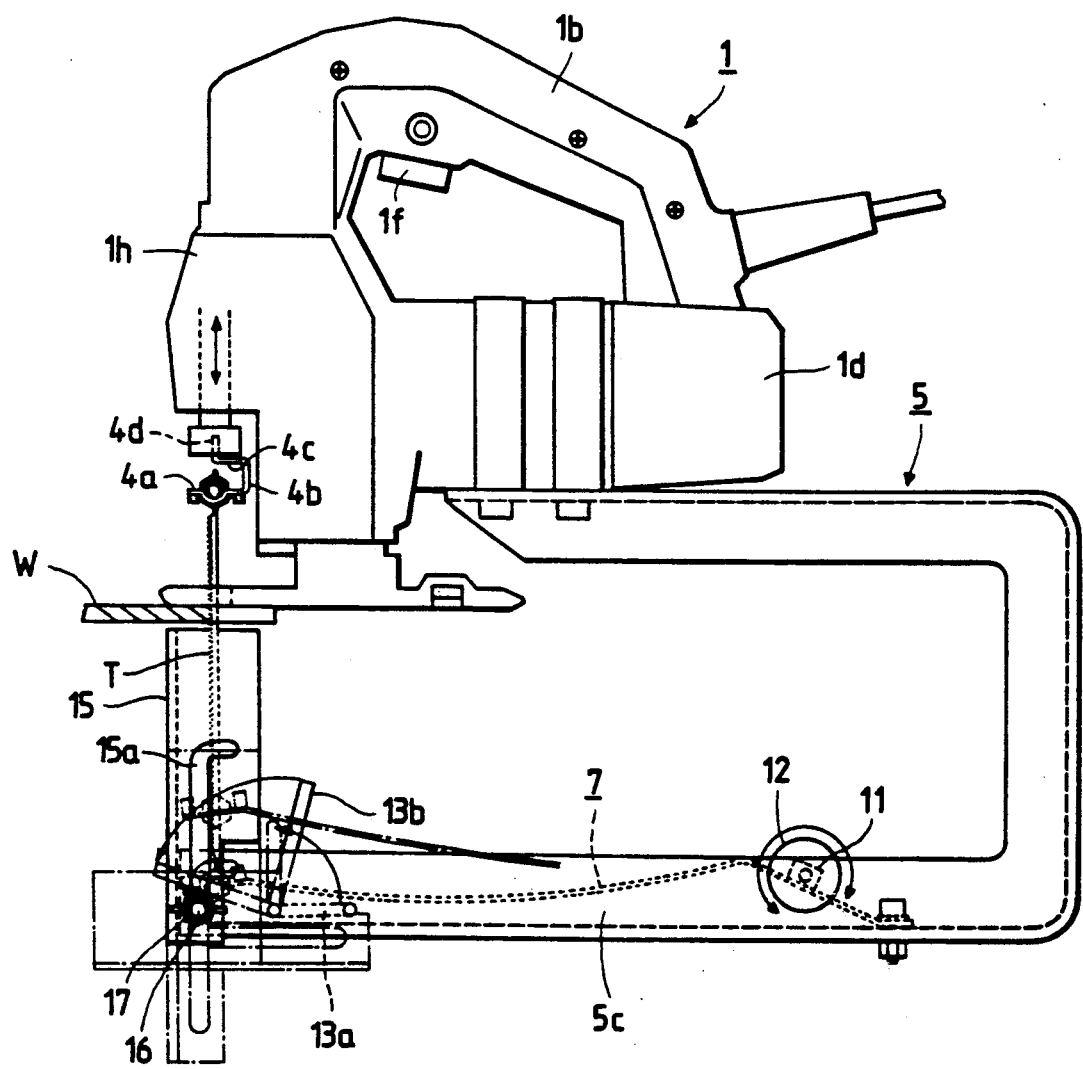
FIG. 2 is a side view of the saw shown in FIG. 1.

As shown in FIGS. 1 and 2, a hand-held scroll saw, according to a first embodiment of the invention, includes a body 1 and a hung member 2. The hung member 2 is removably secured to a sawing blade T at the upper end thereof. A pulled-down member 3 is removably secured to the blade T at the lower end thereof. A hanger 4 is secured to the lower end of the piston 1a of the body 1 so that the hung member 2 can be engaged with the upper surface of the hanger 4. A U-shaped arm 5 is secured to the body 1. A pulling-down member 6 is engaged with the upper surface of the pulled-down member 3. A plate spring 7, attached to the U-shaped arm 5, pulls down the pulling-down member 6 by the elastic restoring force of the spring.

The body 1 includes a handle 1b, located at the upper portion of the body 1, which is grasped by an operator's hand so that the scroll saw can be held. A foot plate 1c, located at the lower portion of the body 1, slides on a workpiece W when the workpiece is being cut by the saw. The piston 1a is provided over the front portion of the foot plate 1c so as to be moved upwardly and downwardly by a stroke of 25 mm. The body 1 also includes a motor 1d, provided between the handle 1b and the foot plate 1c, for moving the piston 1a upwardly and downwardly when a motor switch button 1f is pushed to supply electricity, via a power cable 1e, to the motor.

If a locking button 1g is pushed as the motor switch button 1f is depressed, the motor switch button 1f is locked in a depressed position to maintain the electricity supply to the motor 1d. The piston 1a is the output member of a movement conversion mechanism 1h which converts the rotation of the motor 1d into the straight reciprocation of the piston. After the upper end of the hanger 4 is inserted into the exposed lower end of the piston 1a, a screw 1i is driven horizontally backward into the lower portion of the piston 1a so that the hanger 4 is secured thereto.

Figure 3:
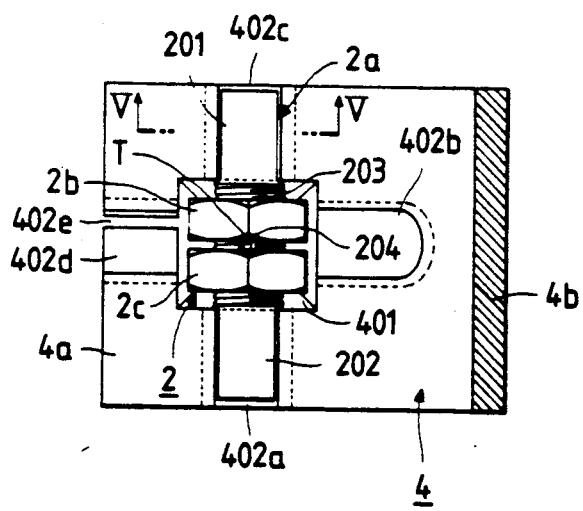
FIG. 3 is a sectional view of the saw along a line III—III shown in FIG. 1.

As shown in FIG. 3, the hung member 2 includes a pivotal shaft 2a and a pair of nuts 2b and 2c. The shaft 2a has lateral portions 201 and 202, each of which is wedge-shaped at the lower part thereof, and a central threaded portion 203 having a small hole 204 at the center thereof. The upper portion of the sawing blade T is inserted through the small hole 204 and secured by the nuts 2b and 2c engaged on the threaded portion 203.

The hanger 4 is hook-shaped, and made of a thick steel plate formed by a press-working operation. Hanger 4 includes a lower portion 4a, with the upper surface thereof engaged with the hung member 2, a vertical portion 4b extending up from the rear end of the lower portion 4a, an upper horizontal portion 4c extending forwardly from the vertical portion 4b, and a second vertical portion 4d extending upwardly from the upper horizontal portion 4c, and inserted into the piston 1a and secured thereto by the tightened screw 1i, as shown in FIG. 2.

Figure 5:
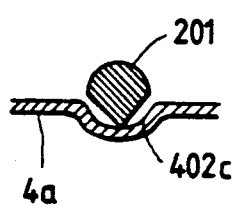
FIG. 5 is a sectional view of the saw along a line V—V shown in FIG. 3.

The lower portion 4a of the hanger 4 has a square opening 401 in the center thereof, and recesses 402a, 402b, 402c, and 402d formed in the upper side of portion 4a by a press-working operation so that the center lines of the recesses coincide with the centers of the four sides of the opening 401, as shown in FIG. 3. The threaded portion 203 and nuts 2b and 2c of the hung member 2 are housed in the opening 401 of the lower portion 4a of the hanger 4. As partially shown in FIG. 5, the lateral portions 201 and 202 of the pivotal shaft 2a of the hang member 2 are fitted in the recesses 402a and 402c of the hanger 4. The cutting edge of the blade T is located at the front thereof.

The pulled-down member 3 has a similar construction to that of the hung member 2, and includes a pivotal shaft 3a and a pair of nuts 3b and 3c engaged on the intermediate threaded portion 303 of the shaft extending parallel to nut 2b of the hung member. The lower portion of the blade T is inserted through the small hole 304 of the threaded portion 303 of the shaft 3b and secured between the nuts 3b and 3c.

The U-shaped arm 5 is made of a channel iron by a press-working operation so that the ribs of the channel iron are located on the inside of the arm 5. As shown in FIGS. 1 and 2, the upper horizontal portion 5a of the arm 5 is secured at the front end thereof to the casing of the motor 1d of the body 1 by a band device 8 for clamping the motor onto the arm 5. The vertical portion 5b of the arm 5 is located at a prescribed lo distance from the rear end of the foot plate 1c of the body 1, so that the vertical portion 5b does not interfere with the workpiece W. The front end of the lower horizontal portion 5c of the arm 5 is located under the piston 1a so that the webs of the portion 5c extend at both sides of the lower end of the blade T.

Figure 4:
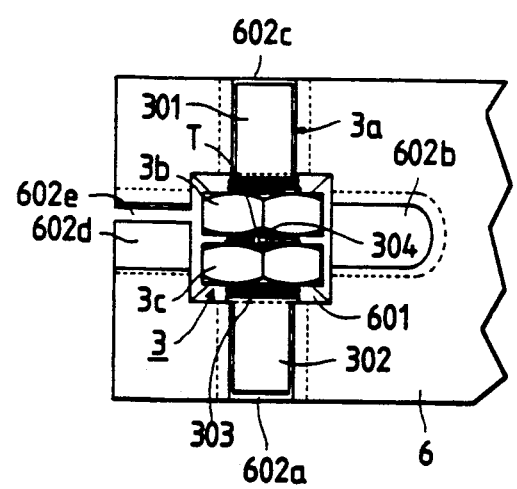
FIG. 4 is a sectional view of the saw along a line IV—IV shown in FIG. 1.

The pulling-down member 6 is integrally provided on the front portion of the plate spring 7 which is relatively long, and pulling-down member 6 has a similar constitution to the lower portion 4a of the hanger 4, as shown in FIG. 4. The pulling-down member 6 has a square opening 601 in the center of the member, and recesses 602a, 602b, 602c, and 602d made in the lower side of the member 6 by a press-working operation so that the center lines of the recesses coincide with the centers of the four sides of the opening 601. The threaded portion 303 of the pivotal shaft 3a of the pulled-down member 3 and the nuts 3b and 3c thereof are housed in the opening 601 of the pulling-down member 6. The lateral portions 301 and 302 of the pivotal shaft 3a, which are wedge-shaped at the upper parts thereof, are fitted in the recesses 602a and 602c of the pulling-down member 6 so that the wedge-shaped upper parts of the portions 301, 302 contact the lower surface of the pulling-down member 6. The elastic force of the plate spring 7 urges the member 6 in a direction so as to move the pulled-down member 3 down.

The plate spring 7 is housed in the channel of the lower horizontal portion 5c of the U-shaped arm 5, and includes a rear portion 7a secured to the lower horizontal portion 5c of the arm 5 by a bolt 9 and a nut 10, a short oblique portion 7b sloping up from the front end of the rear portion 7a, and a long oblique portion 7c sloping down from the front end of the short oblique portion 7b. The pulling-down member 6 extends forwardly from the curved, long oblique portion 7c. The pulling-down member 6 is engaged with the upper side of the pulled-down member 3 so that the pulled-down member 3 is urged downwardly by the spring 7.

The plate spring 7 is urged downwardly by an angular cam 11 located on the upper side of the short oblique portion 7b of the spring, so that the urging force of the long oblique portion 7c acting on the pulled-down member 3 is increased. The angular cam 11 has an oblong cross-section and is eccentrically supported so that the distances from the center of cam rotation to the four sides thereof differ from one another. A knob 12 can be turned to put a selected one of the four sides of the cam 11 into contact with the long oblique portion 7c of the plate spring 7 to set the urging force thereof for the pulled-down member 3 to a suitable one of four levels.

When the distance between the hung member 2 and the pulled-down member 3, which are both secured to the sawing blade T, is large, the knob 12 is turned to increase the urging force of the long oblique portion 7c of the plate spring 7 to set the blade tension to a level to cut the workpiece W optimally. When the distance is small, the knob 12 is turned to decrease the urging force to set the blade tension to a level to cut the workpiece W optimally.

Figure 6:
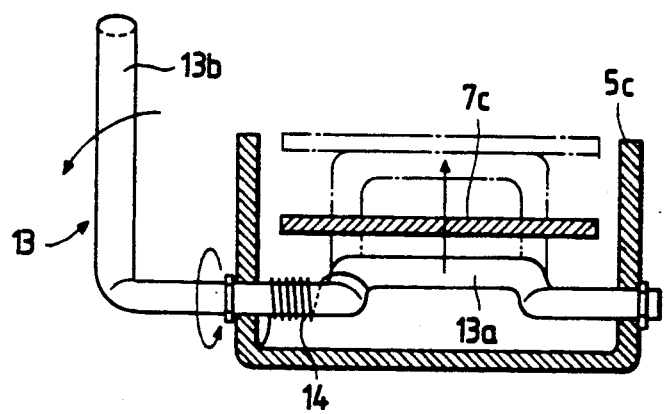
FIG. 6 is a sectional view of the saw along a line VI—VI shown in FIG. 1.

As shown in FIG. 6, a crank-shaped spring lifting lever 13 is provided as a pulled-down member lifting device so as to move the plate spring 7 up, as shown by the one-dot chain lines in FIGS. 1 and 2. The lever 13 has a U-shaped portion 13a, which contacts the spring 7 to move it up, and a handle 13b. The U-shaped portion 13a extends through the small holes of both the webs of the lower horizontal portion 5c of the U-shaped arm 5 and is supported at both ends of the U-shaped portion 13a by the webs.

When the handle 13b, which is upwardly positioned, is turned down forwardly, the U-shaped portion 13a is upwardly positioned instead of the handle 13b so as to move the plate spring 7 up, as shown by the one-dot chain line in FIGS. 1 and 2. A return spring 14 is fitted on the U-shaped portion 13a to turn the U-shaped portion 13a downwardly. However, when the portion 13a is upwardly positioned, the plate spring 7 acts as a stopper to prevent the portion 13a from being turned downwardly by the return spring 14. Thus, even if the handle 13b is released from an operator's hand which is moving the plate spring 7 up by the lever 13, the plate spring is kept moved up.

The lower portion 4a of the hanger 4 has a slit 402e extending along the front recess 402d thereof and communicating with the opening 401 thereof. The pulling-down member 6 has a slit 602e extending along the front recess 602d thereof and communicating with the opening 601 thereof. When the plate spring 7 is moved up so that the distance between the hanger 4 and the pulling-down member 6 decreases, the sawing blade T, to which the hung member 2 and the pulled-down member 3 are already secured, is inserted into the openings 401 and 601 backwardly through the slits 402e and 602e.

Thereafter, the sawing blade T is horizontally turned by 90 degrees so that the portions 201 and 202 of the pivotal shaft 2a of the hung member 2 are fitted in the recesses 402b and 402d of the upper side of the lower portion 4a of the hanger 4, and the portions 301 and 302 of the pivotal shaft 3a of the pulled-down member 3 are fitted in the recesses 602b and 602d of the lower side of the lower portion 6a of the pulling-down member 6. Thus, the hand-held scroll saw can move not only forwardly to cut the workpiece W along a curve, but also can move sidewardly to cut the workpiece along a curve since the orientation (i.e., width direction) of the blade T can be changed by 90 degrees. Thus, the workpiece W can be cut to a slender product by the hand-held scroll saw, even though the U-shaped arm 5 is compact enough to enable the saw to be held easily by an operator.

A safety cover 15 is attached to the lower horizontal portion 5c of the U-shaped arm 5 and is located in front of the blade T. The cover 15 is made of channel iron, and has L-shaped slots 15a in both ribs thereof. A bolt 16 is inserted through the slots 15a and the small holes of the webs of the lower horizontal portion 5c of the U-shaped arm 5. Thereafter, a wing nut 17 is tightened onto the bolt. Thus, the safety cover 15 is secured in an upper position, as shown by a full line in FIG. 2, when the workpiece W has a small thickness. As shown by a one-dot chain line in FIG. 2, the safety cover is secured in a lower position when the workpiece has a large thickness. When the blade T is to be replaced or the direction of the width thereof (i.e., orientation of the blade) is to be changed by 90 degrees, the wing nut 17 is loosened, thus lowering the safety cover 15, and then the lowered cover is turned forwardly.

When the sawing blade T is to be attached to the body 1 and the arm 5, the wing nut 17 is loosened, the safety cover 15 is lowered forwardly, and the spring lifting lever 13 is lowered forwardly to move the plate spring 7 up (via U-shaped portion 13a) to a position shown by the one-dot chain lines in FIGS. 1 and 2. The blade, which has the hung member 2 and the pulled-down member 3 already secured at both ends of the blade, is put into the openings 401 and 601 of the hanger 4 and the pulling-down member 6 through the slits 402e and 602e thereof to engage the hung member with the upper surface of the hanger 4. The spring lifting lever 13 is slowly set up into a position slightly tilted backward from a vertical position, to lower the plate spring 7 to pull down the pulled-down member 3 by the pulling-down member 6 to tighten the blade. Thus, the angular cam 11 is turned by the knob 12 to adjust the urging force of the plate spring 7 to set the blade T at an appropriate tension level. Thereafter, the safety cover 15 is upwardly positioned so as not to interfere with the workpiece W, and the wing nut 17 is tightened securely Thus, the blade T is attached to the body and arm 5.

When the workpiece W is to be cut by the hand-held scroll saw, the saw is held by an operator's hand, the foot plate 1c is put on the edge of the workpiece which has been secured appropriately, and the motor switch button 1f is depressed to drive the motor 1d to reciprocate the piston 1a to move the blade T upwardly and downwardly. Then, the body 1 of the saw is slowly moved along a desired contour.

When the piston 1a is moved upwardly, the plate spring 7 is raised so that the pulling-downmember 6 is moved up from a position lower than the joint of the short and long oblique portions 7b and 7c, respectively, of the plate spring, to a position higher than that of the joint, because of the arc-shaped elastic deformation of the long oblique portion. Thus, the blade T is not vertically lifted per se, but lifted while it is slightly moved forward, so that the blade exerts cutting pressure on the workpiece W. Hence, the workpiece W is cut efficiently by the blade T.

When the piston 1a is moved downwardly, the blade T is pulled downwardly by the urging force of the plate spring 7 attached to the lower portion of the U-shaped arm 5, so that the blade is not vertically moved down per se, but moved downwardly while it is being slightly moved backwardly. Thus, the blade T does not exert cutting pressure on the workpiece W. At that time, the resistance to the blade T being pulled downwardly is so low that the blade is pulled downwardly by the elastic restoring force of the plate spring 7 without cutting the workpiece W. Thus, the blade T is upwardly and downwardly reciprocated by a cooperation of the upward and downward movement of the piston 1a and the downward urging force of the plate spring 7 while always keeping the blade taut, as the body 1 of the hand-held scroll saw is moved along the desired contour drawn on the workpiece. As a result, the workpiece is cut precisely and stably along the drawn contour by the blade.

When the workpiece is to be cut along a desired contour drawn thereon inside the edges thereof, a small hole is drilled in the workpiece, the blade T is put through the small hole, and the hung member 2 and the pulled-down member 3 are then secured to the blade. Thereafter, the blade is attached to the body 1 of the scroll saw as described above, and the cutting operation is started.

During the cutting of the workpiece W by the blade T, a reactionary force acts on the workpiece cutting point in a direction reverse to that of the advance of the blade, so that the blade is slightly bent to an obtuse angle at the cutting point. Since the blade T is moved upwardly and downwardly, the distance between the cutting point and each of the upper and lower ends of the blade always changes so that the slight obtuse-angled bending of the blade continually changes.

Thus, if the blade T was secured at the upper and lower ends thereof, some fluctuating moment would occur due to the reactionary force so that the blade would easily break at the cutting point, even if the reactionary force was increased slightly. However, in the first embodiment of the invention, the sharp edges of the wedge-shaped parts of the portions 201, 202, 301, and 302 of the upper and lower pivotal shafts 2a and 3a are placed on the hanger 4 and the pulling-down member 6 in the recesses 402a, 402c, 602a, and 602c thereof so that the blade T is supported at the upper and lower ends thereof to perform as proper pin fulcrums so as not to let any moment occur due to the reactionary force. Thus, the blade T is unlikely to break even if the workpiece W is cut while exerting a strong cutting force thereon.

The first embodiment of the present invention is not confined to the above-described embodiment, but may be embodied or practiced in other various ways without departing from the spirit or essential character thereof. For example, a helical spring may be provided instead of the plate spring 7. If the helical spring is provided instead of the plate spring 7, the pulling-down member 6, which is integrally provided on the plate spring at the front end thereof in the above-described embodiment, is separately provided.

Further, the motor 1d may be an air motor. The hung member 2 and the pulled-down member 3 may be various conventional pinching devices, so long as the hung member is engaged with the upper surface of the hanger 4 and hung therefrom and the pulled-down member 3 is engaged with the lower surface of the pulling down member 6 and pulled downwardly. The hanger 4 and the pulling-down member 6 also may be constituted so as not to have the slits 402e and 602e. If the hanger 4 and the pulling-down member 6 do not have the slits 402e and 602e, the plate spring 7 is shifted upwardly to decrease the distance between the hanger 4 and the pulling-down member 6, and the hung member 2 is secured to the blade T at the upper end thereof. Thereafter, the lower end thereof is inserted through the openings 401 and 601 of the hanger and the pulling-down member, and the pulled-down member 3 is secured to the blade at the lower end thereof, thus attaching the blade to the body 1.

A second embodiment of the present invention is hereinafter described in detail with reference to FIGS. 7 to 12 attached hereto and which show a scroll saw machine including a sawing blade T, a body 51 having a table 51a on which a workpiece W to be cut is positioned and a piston 51b which is moved upwardly and downwardly, a hung member 52 removably secured to the blade T at the upper end thereof, a pulled-down member 53 removably secured to the blade at the lower end thereof, an arm 54 provided on the body 51, extending upwardly and hanging over off the table 51a, a plate spring 57 which is a part of a suspension unit A provided at the upper horizontal portion of the arm, a hanger 55 integrally formed on the plate spring 57 at the front end thereof and engaged with the hung member 52, and a pulling-down member 56 secured to the piston at the upper end thereof and engaged with the pulled-down member 53.

The body 51 includes the table 51a which has a slit 51d through which the sawing blade T extends. The workpiece W is positioned on the table 51a, and the slit 51d is located near the front end of the top of the base 51e of the body 51. The base 51e has a prescribed form. The body 51 also includes the piston 51b provided in the lower portion of the base 51e at the front end of the portion and located under the slit 51d. The blade T is secured to the piston 51b at the upper end thereof. The body 51 further includes a piston drive means composed of a motor 51c and a mechanism (not shown in the drawings) which converts the rotation of the motor into a reciprocating motion.

The arm 54 is made of channel steel and is J-shaped so that both the flanges thereof are located inside the web thereof. The lower horizontal portion 54a of the arm 54 is secured to the rear portion of the top of the base 51e by bolts. The rear vertical portion 54b of the arm 54 extends upwardly off the table 51a. The front end 54d of the upper horizontal portion 54c of the arm 54 is located over the piston 51b.

The suspension unit A includes the plate spring 57, a spring force adjuster 61 and a hanger lowering/holding member 63, and is much more compact in constitution than that of the conventional scroll saw machine. The rear end 57a of the spring 57 is located in the channel of the upper horizontal portions 54c of the arm 54 and secured to the portion by a bolt 59 and a nut 60. The spring 57 is bent so that it has a short oblique portion 57b obliquely extending down from the rear end 57a of the spring forward, and a long oblique portion 57c obliquely extending up from the short oblique portion forward. The hanger 55 extends from the front end of the long oblique portion 57c so that when the hanger is moved downwardly, the long oblique portion is curved as an arc to store an urging force. Thus, the plate spring 57 elastically supports the hung member 52 to pull the hung member 52 upwardly by the elastic restoring force of the spring along with the upward movement of the piston 51a. The spring 57 can be lifted at the prescribed part thereof near its rear end by the spring force adjuster 61 provided at the upper horizontal portion 54c of the arm 54, so that the urging force of the spring can be adjusted.

The adjuster 61 includes an angular member 61a disposed in the channel of the arm 54, a shaft 61b extending through the angular member 61a eccentrically thereto, integrally conjoined thereto and supported at both ends of the shaft 61b by the flanges of the arm, and a knob 61c secured to the shaft at one end thereof so that the knob can be turned stepwise to lift the plate spring 57 to four different positions (and thus four different spring tension levels) to adjust the upward restoring force of the spring at the front end thereof. The spring 57 is pushed downwardly at a prescribed part thereof near the front end thereof by a hanger lowering/holding member 63 in attaching, replacing and/or adjusting the sawing blade T.

The hanger lowering/holding member 63 has a crank bar 63a including a U-shaped spring pushing-down portion 181 supported at both the ends thereof by the flanges of the arm 54, and a handle 182. A spring 63b urges the crank bar 63a to place the spring pushing-down portion 181 in a horizontal position and place the handle 182 in a vertical position. When the handle 182 is lifted forwardly, the spring pushing-down portion 181 is swung downwardly to push the plate spring 57 downwardly to keep the spring pushed down and to decrease the distance between the hanger 55 and the pulling-down member 56 than that normally kept between the engaged points of the hung member 52 and the pulled-down member 53 on the hanger 55 and the pulling-down member 56.

Figure 9:
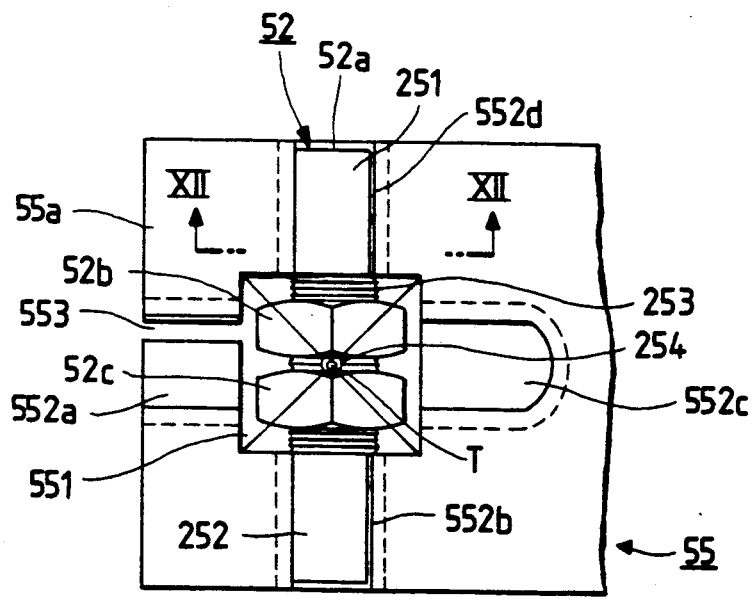
FIG. 9 is a sectional view of the saw machine taken along a line IX—IX shown in FIG. 7.

As shown in FIG. 9, the hung member 52 includes a pivot 52a, and a pair of nuts 52b and 52c. The pivot 52a includes lateral slender portions 251 and 252 whose lower parts are wedge-shaped at and near their outer ends, and a central threaded portion 253. The central part of the central threaded portion 253 has a small hole 254 through which the sawing blade T extends. The nuts 52b and 52c are engaged with the central threaded portion 253 from both the ends thereof to pinch and hold securely the upper portion of the blade T.

Figure 10:
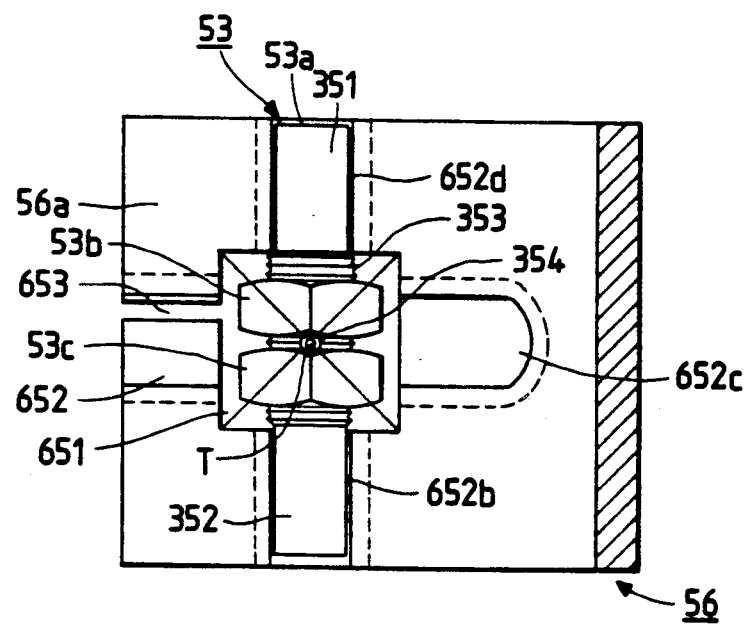
FIG. 10 is a sectional view of the machine taken along a line X—X shown in FIG. 7.
Figure 11:
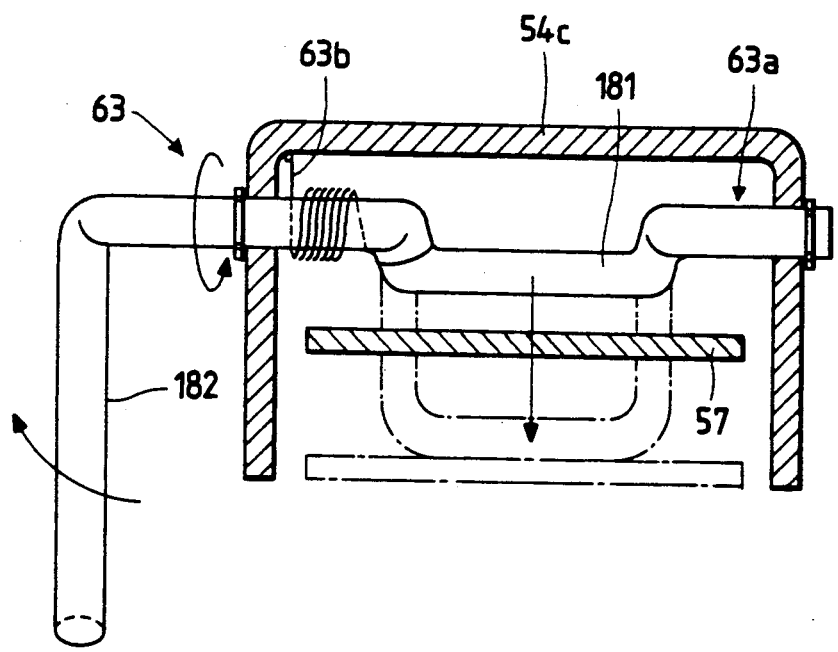
FIG. 11 is a sectional view of the machine taken along a line XI—XI shown in FIG. 7.
Figure 12:
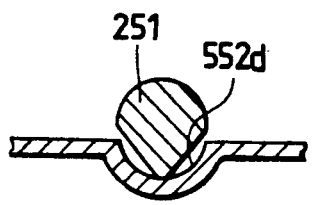
FIG. 12 is a sectional view of the machine taken along a line XII—XII shown in FIG. 9.

As shown in FIG. 10, the pulled-down member 53 includes a pivot 53a, and a pair of nuts 53b and 53c, similarly to the hung member 52. The pivot 53a includes lateral slender portions 351 and 352 whose upper parts are wedge-shaped at and near their outer ends, and a central threaded portion 353. The central part of the central threaded portion 353 has a small hole 354 through which the sawing blade T extends. The nuts 53b and 53c are engaged with the central threaded portion 353 from both the ends thereof to pinch and hold securely the lower portion of the blade T. The hung member 52 and the pulled-down member 53 are thus attached to the blade T so that the members extend perpendicularly to the width direction of the blade.

Although the hanger 55 is integrally formed on the front end of the long plate spring 57 which is a part of the suspension unit A, the hanger may be formed separately from the spring and then secured thereto. The hanger 55 has an engagement portion 55a with which the hung member 52 is engaged so that the member 52 is borne on engagement portion 55a.

The pulling-down member 56 is formed of a thick steel band and shaped like a hook by a press working separation, and includes an upper engagement portion 56a with which the pulled-down member 53 is engaged so that the portion 56a is borne on pulled-down member 53. The pulling-down member 56 also includes a lower fitted portion 56b firmly coupled to the piston 51b by a bolt.

The engagement portion 55a of the hanger 55 is shaped so that the central part of the portion has a rectangular opening 501 in which the pair of nuts 52b and 52c engaged with the central threaded portion 253 of the pivot 52a are housed. Engagement portion 55a has four recesses 552a, 552b, 552c and 52d formed in the top of the engagement portion 55a around the opening by a press working operation and disposed cruciformly, and a slit 553 provided in the front recess 552a and extending to the opening 551. The engagement portion 56a of the pulling-down member 56 is shaped oppositely to portion 55a of the hanger 55 and is located directly under the hanger 55, and has an opening 651, recesses 652a, 652b, 652c and 652d, and a slit 653 similarly to the hanger 55.

When the width of the sawing blade T is oriented forwardly, the right and left recesses 552d and 552b of the hanger 55 and right and left recesses 652d and 652b of the pulling-down member 56 are substantially aligned with and contact the wedge-shaped parts of the lateral slender portions 251 and 252 of the pivot 52a of the hung member 52 and those of the lateral slender portions 351 and 352 of the pivot 53a of the pulled-down member 53, respectively.

When the width of the blade T is oriented sidewardly, the front and rear recesses 552a and 552c of the hanger 55 and the front and rear recesses 652a and 652c of the pulling-down member 56 are substantially aligned with and contact the wedge-shaped parts of the lateral slender portions 251 and 252 of the pivot 52a of the hung member 52 and those of the lateral slender portions 351 and 352 of the pivot 53a of the pulled-down member 53, respectively. Thus, the hung member 52 and the pulled-down member 53 can be stably engaged with the hanger 55 and the pulling-down member 56, in either of two mutually perpendicular directions, so that the blade T is pivotally coupled at a lower end thereof to the piston 51b and at an upper end thereof to the front end of the plate spring 57 and always tensioned by the spring.

The scroll saw machine according to the second embodiment of the present invention also includes a safety cover 65 attached to the upper horizontal portion 54c of the arm 54 at the front end of the portion. The cover 65 is shaped as channel steel, and has J-shaped openings 65a in both flanges thereof. Bolts 66 are laid through the openings 65a and the small holes of both the flanges of the upper horizontal portion 54c of the arm 54 are engaged with wing nuts 67, which are tightened to secure the cover to the arm.

Figure 7:
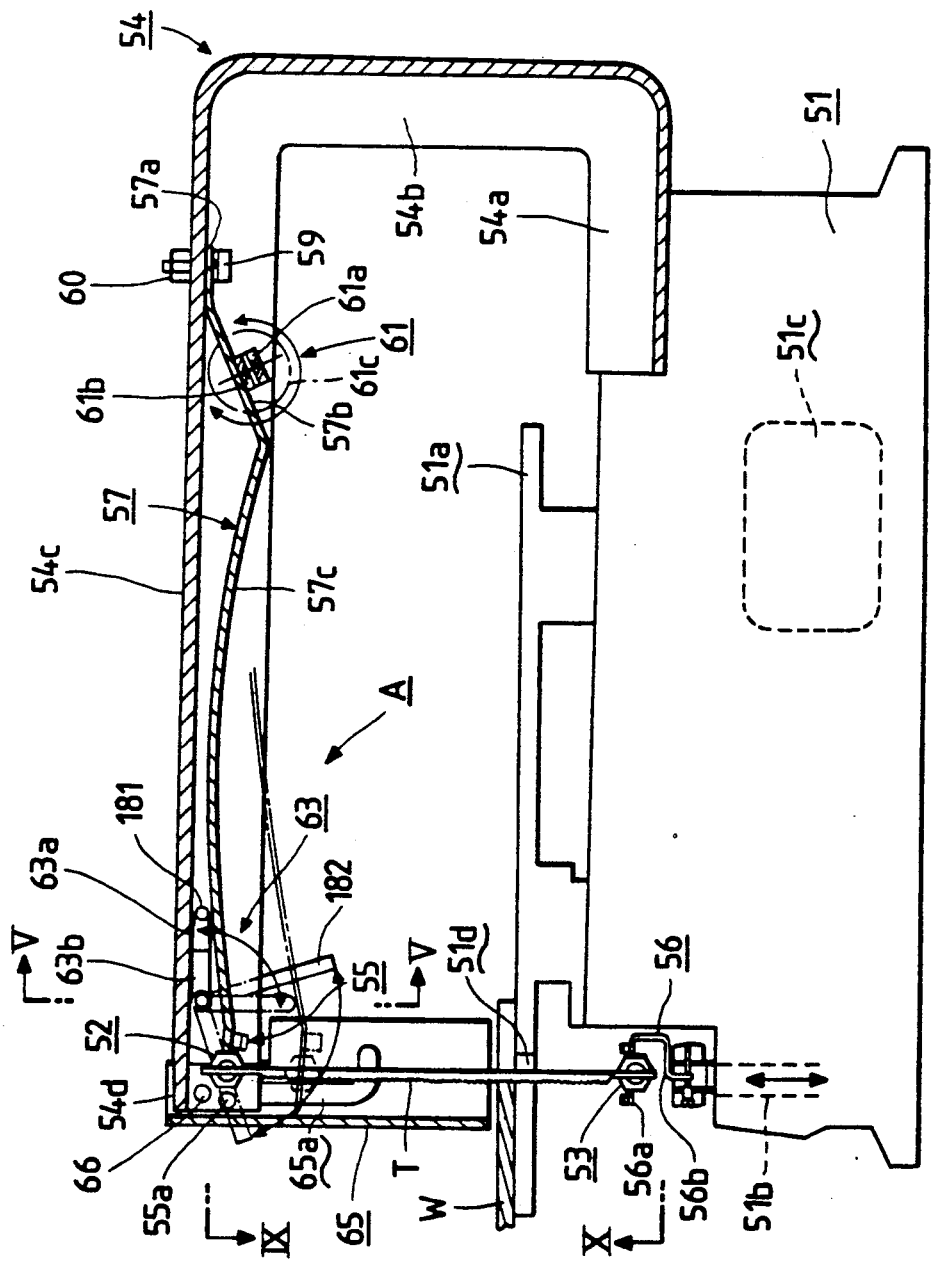
FIG. 7 is a longitudinally sectional side view of a scroll saw machine which is a second embodiment of the present invention.
Figure 8:
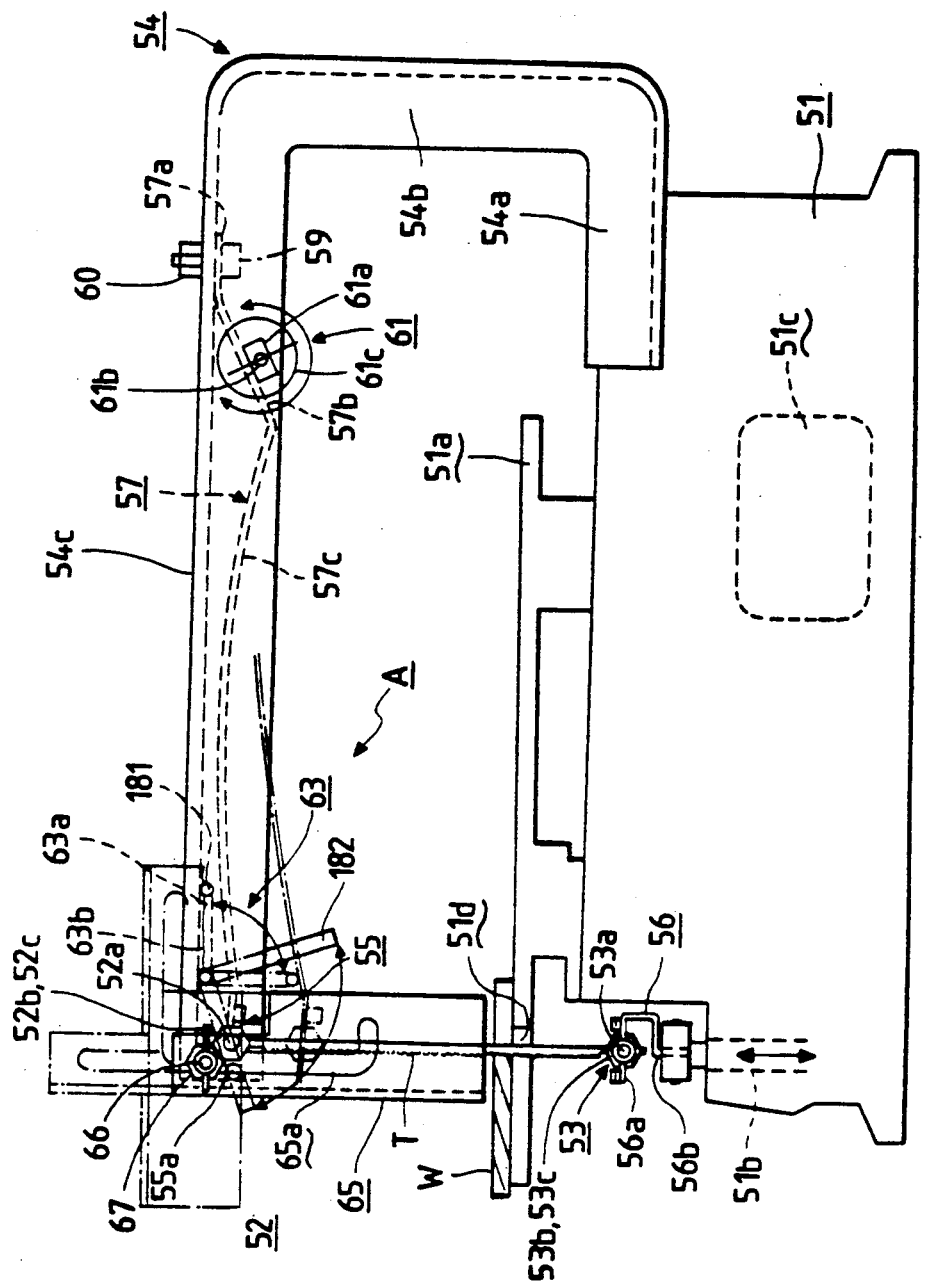
FIG. 8 is a side view of the saw machine.

If the workpiece W has a small thickness, the cover 65 is secured to the arm 54 to take a lower position shown by the full lines in FIG. 7. If the workpiece W has a large thickness, the cover 65 is secured to the arm 54 to take an appropriately lifted position shown by the one-dot chain lines in FIG. 8. When the blade T is to be attached or replaced or the width direction thereof is to be changed, the wing nuts 67 are loosened and the cover 65 is then swung upwardly and forwardly into a horizontal position shown by the second one-dot chain lines in FIG. 8.

Hereinafter, the operation of the scroll saw machine according to the second embodiment of the present invention is described in detail. If the blade T is to be attached or replaced or the width direction thereof (e.g., operation of blade T) is to be changed from forward to sideward or vice versa, the wing nuts 67 are loosened, the safety cover 65 is swung up, and the handle 182 of the hanger lowering/holding member 63 is lifted so that the front end of the long front portion 57c of the plate spring 57 is moved down by the spring pushing-down portion 181 of the member 63 to make the distance between the hanger 55 and the pulling-down member 56 smaller than the normal distance between the engaged points of the hung member 52 and the pulled-down member 53 on the hanger and the pulling-down member.

Then, the blade T having its ends secured to the hung member 52 and the pulled-down member 53 is placed through the slits 553 and 653 of the hanger 55 and the pulling-down member 56 so that the hung member 52 is borne on the hanger 55. Then, the handle 182 is slowly moved down to lift the front end of the plate spring 57 to engage the pulled-down member 53 with the pulling-down member 56 to bear the pulling-down member 56 on the pulled-down member and to tighten the blade T. The knob 61c of the spring force adjuster 61 is turned to adjust the urging force of the plate spring 57 to adjust the tension of the blade T appropriately. Then, the safety cover 65 is swung down and set at such a height as not to interfere with the workpiece W. Thereafter, the wing nuts 67 are tightened. Thus, the blade T can be attached, replaced or reoriented easily.

To cut the workpiece W along an endless line by the scroll saw machine, the blade T is put through a small hole drilled in the workpiece in advance, and is then secured to the hung member 52 and the pulled-down member 53, and attached to the hanger 55 and the pulling-down member 56 as described above.

The maximum length of the workpiece W able to be cut in the front-to-rear direction of the scroll saw machine with blade T having its width oriented forwardly is less than the distance between the blade and the rear vertical portion 54b of the arm 54.

If the workpiece W is to be cut by more than the maximum length able to be cut in the front-to-rear direction of the machine, the width of the blade T is oriented sidewardly. Hence, the handle 182 is lifted to move downwardly the front end of the long front portion 57c of the plate spring 57 by the spring pushing-down portion 181 to disengage the pulled-down member 53 from the engagement surface 56a of the pulling-down member 56. The blade T is grasped at the intermediate portion thereof and lifted to disengage the hung member 52 from the engagement surface 55a of the hanger 55, and the width direction of the blade is changed from forward to sideward. The hung member 52 is engaged again with the engagement surface of the hanger 55 to extend in a direction differing by 90 degrees from the preceding direction of the hung member. Thereafter, the plate spring 57 is put back into its original position so that the hanger 55 lifts the hung member 52, and the pulled-down member 53 is engaged with the engagement surface 56a of the pulling-down member 56 to extend in a direction differing by 90 degrees from the preceding direction of the pulled-down member 53. Then, the tension of the blade is adjusted appropriately, thus completing the change of the direction of the blade width (e.g., the orientation of the blade).

To cut the workpiece W with the scroll saw machine, the motor 51c is driven so that the piston 51b is moved upwardly and downwardly. The workpiece W is positioned on the table 51a so that the desired cutting start point of the edge of the workpiece is located at the blade T. Then, the workpiece W is pushed onto the table 51a and moved as the blade T cuts along a contour line drawn on the workpiece. As a result, the workpiece is cut along the desired line by the blade T as the piston 51b is moved downwardly, thereby pulling the blade downwardly. When the piston 51b is moved upwardly, the blade T is pulled up so that the blade is kept taut by the urging force of the plate spring 57. The downward movement of the piston 51b and the upward urging action of the plate spring 57 in the upward movement of the piston thus cooperate together so that the blade T is properly moved upwardly and downwardly to proceed with the cutting of the workpiece W along the desired line as the blade moves along the desired line.

While certain preferred embodiments have been shown and described, many changes and modifications within the spirit of the invention will be apparent to those of working skill in this technical field. Thus, the scope of the invention should be considered as limited only by the appended claims.

What is claimed is:

1. A scroll saw machine for sawing a workpiece, comprising:
   a body including a piston movable upwardly and downwardly, and piston drive means for driving said piston;
   a sawing blade having first and second ends;
   a hung member removably secured to one of said first and second ends of said blade;
   a pulled-down member removably secured to the other of said one of said first and second ends of said blade;
   an arm secured to said body;
   a hanger engageable with said hung member;
   a pulling-down member engageable with said pulled-down member; and
   a suspension unit secured to said arm and comprising means for tensioning said blade and adjusting means for adjusting a force of said tensioning means,
   wherein one of said pulled-down member and said pulling-down member is secured to said piston and the other one is secured to said suspension unit such that said blade is tensioned by said suspension unit to exert cutting pressure on said workpiece exclusively while said blade is moved in one of a first and second direction, said adjusting means comprising a cam which is eccentrically supported such that the force of said tensioning means is selectively adjusted in a stepped manner.

2. A scroll saw machine according to claim 1, wherein said saw machine is a fixed-installation type, said sawing blade being coupled to a first end of said piston, said body further including a table which forms a first portion of said body and which has said workpiece positioned thereon, and which has a slit formed therein through which said sawing blade extends, and a piston provided substantially in line with said slit and a which is movable upwardly and downwardly and to which said blade is secured at a first end thereof.

3. A scroll saw machine according to claim 1, wherein said scroll saw machine is a hand-held type, said scroll saw machine further comprising a handle adapted to be grasped by an operator, said arm being U-shaped.

4. A scroll saw machine according to claim 1, wherein said pulling-down member is secured to said piston at a first end thereof and said hanger is engageable with said hung member so that said hung member is borne on said hanger, in which said pulling-down member is engageable with said pulled-down member so that said pulling-down member is borne on said pulled-down member.

5. A scroll saw machine according to claim 1, wherein said suspension unit overhangs said piston at a tip of said unit and elastically urges said hanger at said tip to pull said hanger upwardly by the elastic restoring force of said suspension unit along with an upward movement of said piston.

6. A scroll saw machine according to claim 1, wherein said suspension unit overhangs said piston at a tip of said suspension unit and elastically urges said pulled-down member at said tip to pull said pulled-down member downwardly by an elastic restoring force of said suspension unit along with a downward movement of said piston.

7. A scroll saw machine according to claim 1, wherein said suspension unit is secured to an upper horizontal portion of said arm in substantially a same plane as said hanger.

8. A scroll saw machine according to claim 1, wherein said suspension unit is secured to a lower horizontal portion of said arm in substantially a same plane as said pulled-down member.

9. A scroll saw machine according to claim 1, wherein a surface of said hanger which engages said hung member, and a surface of said pulling-down member which engages said pulled-down member, have recesses in which said hung member and said pulled-down member are stably fitted so that each of said hung member and said pulled-down member are optionally oriented in one of first and second directions, said first and second directions differing from each other by an angle of 90 degrees.

10. A scroll saw machine according to claim 1, further comprising means for moving said tensioning means against an urging force of said tensioning means at a time of replacement or a change of orientation of said sawing blade, said moving means being provided on said arm.

11. A scroll saw machine according to claim 10, said tensioning means being coupled to said hung member, wherein said moving means moves said tensioning means to lower said tensioning means such that said hung member is lowered.

12. A saw machine according to claim 11, wherein said moving means contacts said tensioning means to move said tensioning means in a downward direction.

13. A scroll saw machine according to claim 10, said tensioning means being coupled to said pulling-down member, wherein said moving means moves said tensioning means to lift said tensioning means such that said pulling-down member is lifted.

14. A scroll saw machine according to claim 13, wherein said moving means contacts said tensioning means to move said tensioning means in an upward direction.

15. A scroll saw machine according to claim 1, wherein said tensioning means comprises a plate spring.

16. A scroll saw machine according to claim 15, wherein said pulling-down member is integrally provided with said plate spring.

17. A scroll saw machine according to claim 15, wherein said hanger is integrally provided with said plate spring.

18. A scroll saw machine according to claim 1, wherein said cam contacts said tensioning means, and an elastic restoring force of said tensioning means is adjusted optionally by said cam.

19. A scroll saw machine for sawing a workpiece, comprising:
   a body including a table having said workpiece positioned thereon, and having a slit formed therein through which a sawing blade having first and second ends extends, said body further including a piston movable upwardly and downwardly being provided under said slit, and piston drive means for driving said piston;
   a hinge member removably secured to said first end of said blade;
   a pulled-sown member removably secured to said second end of said blade;
   an arm secured to said body;
   a hanger engageable with said hung member;

a pulling-down member secured to said first end of said piston and engageable with said pulled-sown member; and a suspension unit secured to said arm and said hanger to elastically urge said hanger to pull said hanger upwardly by an elastic restoring force of said suspension unit with an upward movement of said piston, wherein said suspension unit includes tensioning means for supporting and lifting said hanger to tension said blade, and means for adjusting an urging force of said tensioning means such that said blade is tensioned by said suspension unit to exert cutting pressure on said workpiece exclusively while said blade is moved in one of a first and second direction, said adjusting means comprising a cam which is eccentrically supported such that the force of said tensioning means is selectively adjusted in a stepped manner.

20. A scroll saw machine according to claim 19, wherein said tensioning means has first and second ends.

21. A scroll saw machine according to claim 20, wherein said arm comprises an upper horizontal portion, and wherein said first end of said tensioning means is secured to said upper horizontal portion of said arm.

22. A scroll saw machine according to claim 20, wherein said second end of said tensioning means is integrally formed with said hanger.

23. A scroll saw machine according to claim 19, wherein said arm has an upper horizontal portion, and said adjusting means is provided at said upper horizontal portion of said arm so that said tensioning means is lifted at a prescribed part thereof to adjust an upward restoring force of said tensioning means at said second end thereof.

24. A scroll saw machine according to claim 19, wherein said arm is J-shaped, and extends so that said arm rises from a first point behind said table and a front end of an upper horizontal portion of said arm is located at a prescribed point over said piston.

25. A scroll saw machine according to claim 19, wherein said arm has an upper horizontal portion, and said moving means includes a hanger lowering/holding member provided at said upper horizontal portion of said arm for lowering said hanger to decrease a distance between said hanger and said pulling-down member.

26. A scroll saw machine for sawing a workpiece, comprising:

a body including a table, said table bearing said workpiece thereon and having a slit through which a sawing blade having first and second ends extends, said body further including a piston provided under said slit which is movably upwardly and downwardly and to which said blade is secured, and a piston drive means for driving said piston;

a hung member removably secured to said first end of said blade;

a pulled-down member removably secured to said second end of said blade;

an arm secured to said body;

a hanger engageable with said hung member so that said hung member is borne on said hanger;

a pulling-down member secured to said piston at an upper end thereof and engageable with said pulled-down member so that said pulling-down member is borne on said pulled-down member; and a suspension unit secured to said arm and said hanger, said suspension unit elastically urging said hanger such that said blade is tensioned by said suspension unit to exert cutting pressure on said workpiece exclusively while said blade is moved in one of a first and second direction, wherein said hanger and said pulling-down member each have engagement portion means having cruciformly-disposed recesses for supporting said hung member and said pulled-down member to extend in one of two mutually perpendicular directions.

27. A scroll saw machine according to claim 26, wherein said arm has an upper horizontal portion, and said moving means includes a hanger lowering/holding member provided at said upper horizontal portion of said arm for lowering said hanger to decrease a distance between said hanger and said pulling-down member.

28. A scroll saw machine for sawing a workpiece, comprising:

a body including a piston movable upwardly and downwardly, and a piston drive means for driving said piston;

a sawing blade having first and second ends;

a hung member removably secured to one of said first and second ends of said blade;

a pulled-down member removably secured to the other of said one of said first and second ends of said blade;

an arm secured to said body;

a hanger engageable with said hung member;

a pulling-down member engageable with said pulled-down member; and a suspension unit secured to said arm and comprising means for tensioning said blade, in which one of said pulled-down member and said pulling-down member is secured to said piston and the other one is secured to said suspension unit such that said blade is tensioned by said suspension unit to exert cutting pressure on said workpiece exclusively while said blade is moved in one of a first and second direction, and wherein said hanger and said pulling-down member each have engagement portion means having cruciformly-disposed recesses for supporting said hung member and said pulled-down member to extend in one of two mutually perpendicular directions.

29. A scroll machine according to claim 28, further comprising means for moving said tensioning means against an urging force of said tensioning means at a time of replacement or a change of orientation of said sawing blade, said moving means being provided on said arm.

30. A scroll machine according to claim 28, further comprising adjusting means for adjusting said tensioning means to adjust a tension on said blade, wherein said adjusting means contacts said tensioning means, and an elastic restoring force of said tensioning means is adjusted optionally by said adjusting means.

31. A scroll saw machine according to claim 30, wherein said adjusting means comprises a cam which selectively adjusts said tensioning means in a stepped manner.

32. A scroll saw machine for sawing a workpiece, comprising:

a body including a piston movable upwardly and downwardly, and a piston drive means for driving said piston, a sawing blade having first and second ends;

a hung member removably secured to one of said first and second ends of said blade;

a pulled-down member removably secured to the other of said one of said first and second ends of said blade;

an arm secured to said body;

a hanger engageable with said hung member;

a pulling-down member engageable with said pulled-down member; and a suspension unit secured to said arm and comprising means for tensioning said blade, wherein one of said pulled-down member and said pulling-down member is secured to said piston and the other one is secured to said suspension unit such that said blade is tensioned by said suspension unit to exert cutting pressure on said workpiece exclusively while said blade is moved in one of first and second directions; and means for moving said tensioning means against an urging force of said tensioning means.

33. A scroll saw machine according to claim 32, further comprising adjusting means for adjusting said tensioning means to adjust a tension on said blade, said adjusting means contacts said tensioning means, and an elastic restoring force of said tensioning means is adjusted optionally by said adjusting means.

34. A scroll saw machine according to claim 32, wherein said adjusting means comprises a cam which selectively adjusts said tensioning means in a stepped manner.

35. A scroll saw machine according to claim 32, wherein a surface of said hanger which engages said hung member, and a surface of said pulling-down member which engages said pulled-down member, have recesses in which said hung member and said pulled-down member are stably fitted so that each of said hung member and said pulled-down member are optionally oriented in one of first and second directions, said first and second directions differing from each other by an angle of 90 degrees.

36. A scroll saw machine for sawing a workpiece, comprising:

a body including a table having said workpiece positioned thereon, and having a slit formed therein through which a sawing blade having first and second ends extends, said body further including a piston movable upwardly and downwardly being provided under said slit, and piston drive means for driving said piston;

a hung member removably secured to said first end of said blade;

a pulled-down member removably secured to said end of said blade;

an arm secured to said body;

a hanger engageable with said hung member;

a pulling-down member secured to said first end of said piston and engageable with said pulled-down member;

a suspension unit secured to said arm and said hanger to elastically urge said hanger to pull said hanger upwardly by an elastic restoring force of said suspension unit with an upward movement of said piston, wherein said suspension unit includes tensioning means for tensioning said blade to exert cutting pressure on said workpiece exclusively while said blade is moved in one of a first and second direction; and means for moving said tensioning means against an urging force of said tensioning means.

37. A scroll saw machine according to claim 36, further comprising adjusting means for adjusting said tensioning means to adjust a tension on said blade, said adjusting means contacts said tensioning means, and an elastic restoring force of said tensioning means is adjusted optionally by said adjusting means.

38. A scroll saw machine according to claim 36, wherein a surface of said hanger which engages said hung member, and a surface of said pulling-down member which engages said pulled-down member, have recesses in which said hung member and said pulled-down member are stably fitted so that each of said hung member and said pulled-down member are optionally oriented in one of first and second directions, said first and second directions differing from each other by an angle of 90 degrees.

39. A scroll saw machine according to claim 36, wherein said tensioning means is coupled to said hung member, and said moving means moves said tensioning means to lower said tensioning means such that said hung member is lowered, said moving means contacting said tensioning means to move said tensioning means in a downward direction.

* * * * *